United States Patent [19]

Borlinghaus et al.

[11] Patent Number: 4,881,827
[45] Date of Patent: Nov. 21, 1989

[54] APPARATUS AND METHOD OF ANTI-RATCHETING VEHICLE SEAT ADJUSTER SLIDE

[75] Inventors: Hans J. Borlinghaus, Roseville; Michael G. Orlowsky, Sterlin Heights; Neil G. Goodbred, Royal Oak; Mladen Humer, East Detroit, all of Mich.; Steven J. Cooper, Breaston, England

[73] Assignee: General Motors Corporation, Detroit, Mich.

[21] Appl. No.: 162,736

[22] Filed: Mar. 2, 1988

[51] Int. Cl.⁴ .................................................. A47C 3/00
[52] U.S. Cl. ...................................... 384/47; 248/430; 297/341; 384/34
[58] Field of Search ................. 384/34, 47, 21, 48–50; 296/65 R; 297/341; 248/430; 312/341

[56] References Cited

U.S. PATENT DOCUMENTS

| | | | |
|---|---|---|---|
| 3,940,182 | 2/1976 | Tamura | 297/341 |
| 4,478,383 | 10/1984 | Urai | 248/430 X |
| 4,563,044 | 1/1986 | Rees | 384/18 |
| 4,580,755 | 4/1986 | Rees | 248/430 |
| 4,648,657 | 3/1987 | Cox et al. | 297/341 |

Primary Examiner—Thomas R. Hannon
Attorney, Agent, or Firm—Ernest E. Helms

[57] ABSTRACT

The present invention provides an apparatus and method of utilization thereof of an anti-ratchet vehicle seat adjuster slide. A preferred embodiment provides an adjuster slide having an upper channel connected with the seat slidably mounted on a lower channel connected with the vehicle. The adjuster slide also has a latch pivotally connected with the upper channel having a range of pivotal movement independent of a lift bar which is also pivotally connected with the upper channel. To allow adjustment of the seat the lift bar is controlled by the operator and pulled upwards causing the latch to pivot upwards also and release from the lower channel. The latch also is provided with a tab having a curvilinear surface of engagement with the notches of the lower channel. The curvilinear surface of the latch tab allows the latch to have a generally constant cam angle of engagement with the notch of the lower channel regardless of the angular orientation of the latch when the tab is in engagement with one of the notches. The above action causes the tab is seek insertion into the latch and not to be pushed out of the latch due to the poor cam angle presentation.

17 Claims, 4 Drawing Sheets

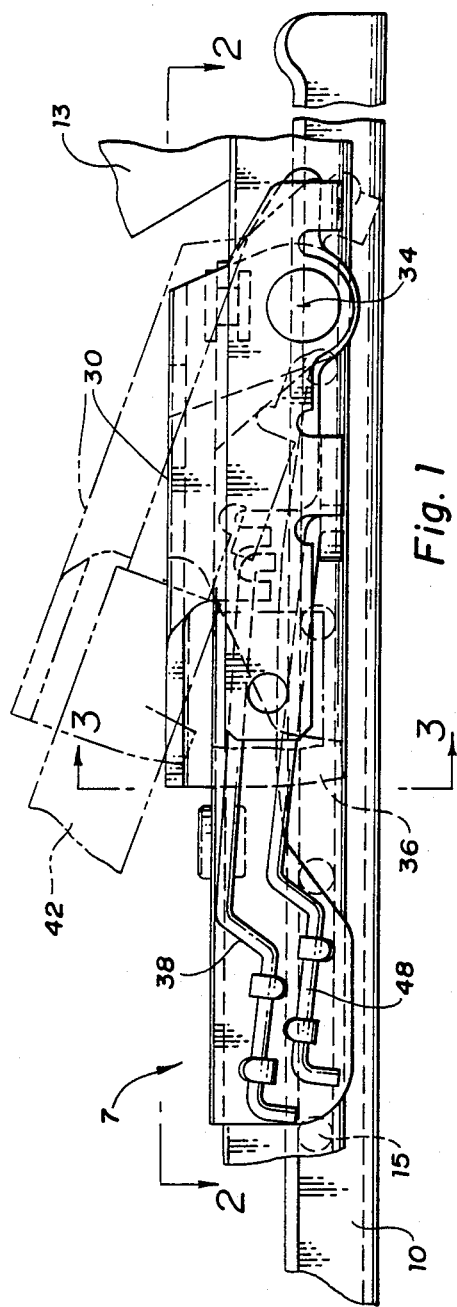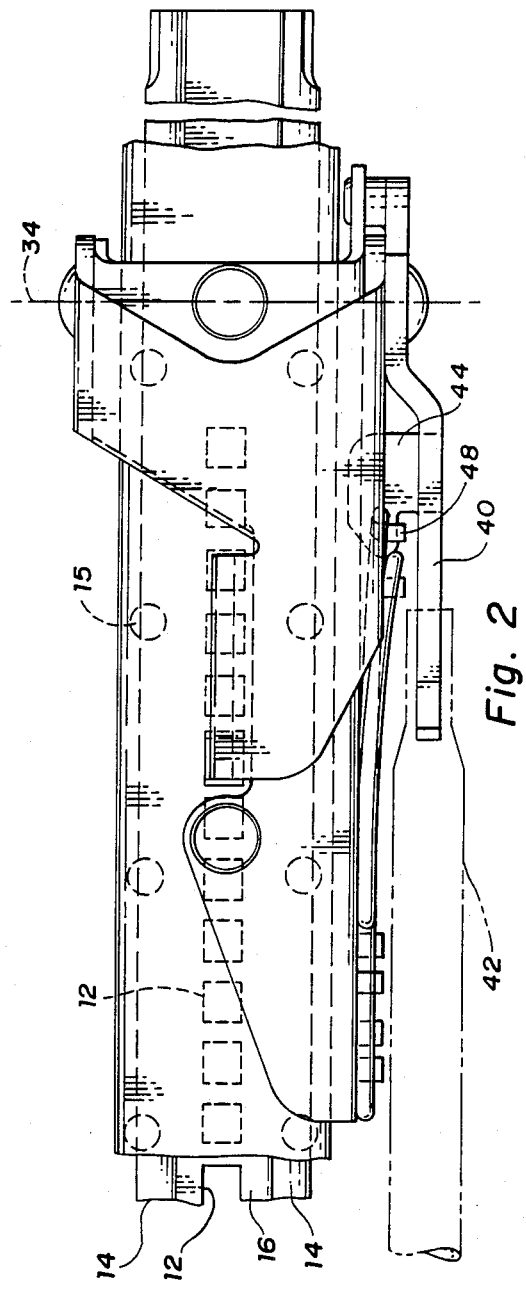

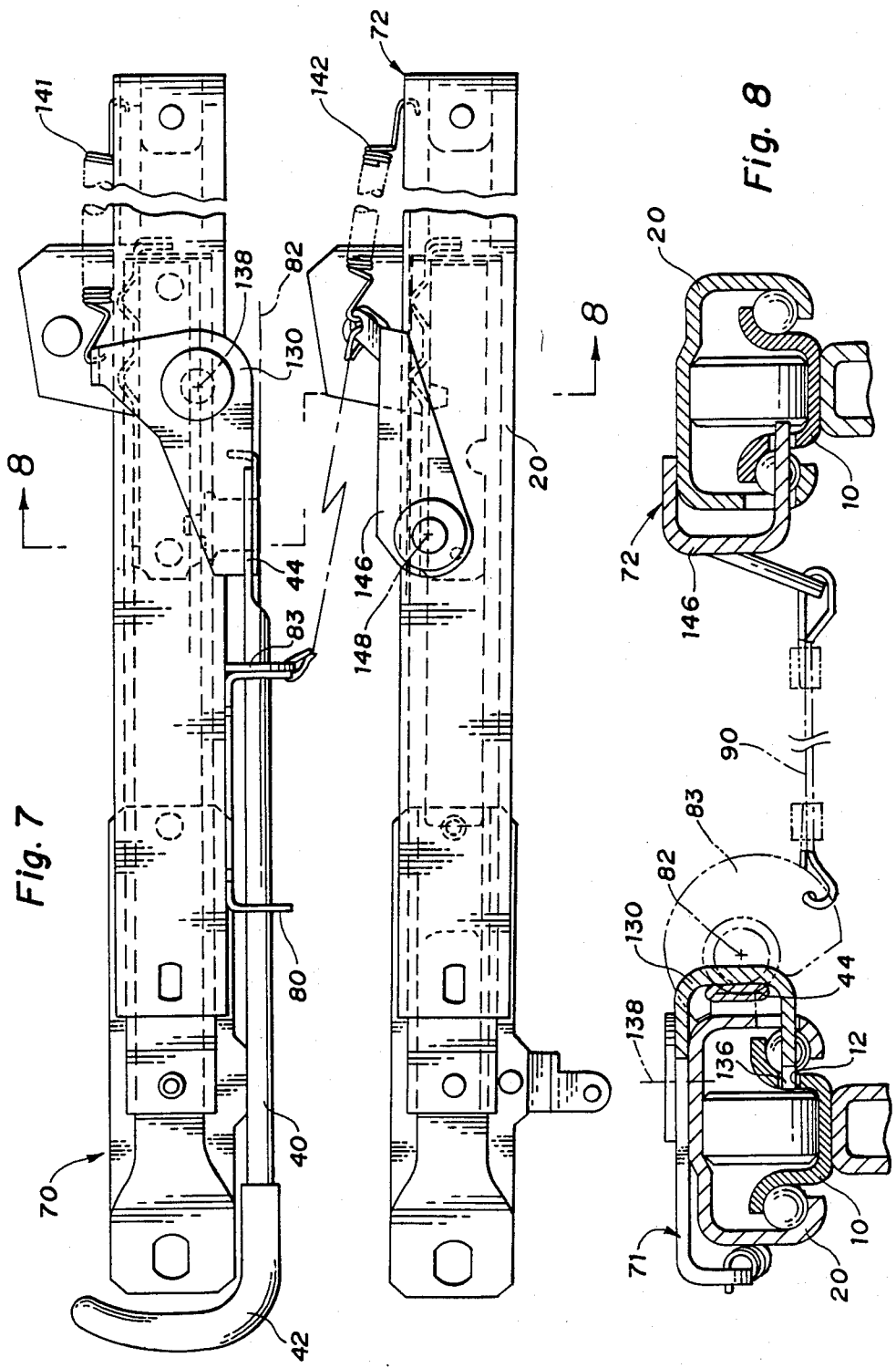

APPARATUS AND METHOD OF ANTI-RATCHETING VEHICLE SEAT ADJUSTER SLIDE

FIELD OF THE INVENTION

The field of the present invention is that of vehicle seat adjusters and seat adjuster slides. More particularly the field of the present invention is of manual vehicle seat adjusters and seat adjuster slides adjustable in a fore and aft orientation.

DISCLOSURE STATEMENT

It is known to provide a vehicle seat adjuster slides to allow a seat to be adjustable fore and aft within a vehicle. A typical seat adjuster slide has a floor channel which is fixably connected to the vehicle floor.

The word channel is an industry term and is sometimes synonymously called a rail. The word channel as used in this application refers to such a member whether or not such member has a channel shaped cross sectional profile.

Slidably mounted on the lower channel is an upper or seat channel which is connected with the vehicle seat. The lower channel has a series of longitudinally spaced notches. Pivotally connected in a vertical or horizontal plane with the upper channel is a latch having a tab which can be selectively engaged with one of the notches of the lower channel to set the position of the seat within the vehicle. In a trimount seat adjuster, the latch is connected on a single central slide and is provided with a handle called a lift bar. A quadmounted seat will typically have two virtually identical slide master/slave horizontally latched units mounted in parallel to each other. A cable connects the slave latch to the master latch. A pull on the handle causes simultaneous operation of both latches. An example of a horizontally latch quadmounted seat adjuster is shown and described in Goodbred U.S. Pat. No. 4,711,589 commonly assigned. In a vertically latched quadmounted seat adjuster, the latches of both slide units are connected with a U-shaped lift bar for simultaneous operation.

To adjust the seat the operator will twist or pull up on the lift bar and use his legs to move the seat towards the next desired location and then release the lift bar. Sometimes when releasing the lift bar the latch will not properly engage and the seat will move past the desired location. The above noted action of the latch skipping over a notch and engaging in the wrong notch or not engaging at all is referred to as ratcheting. It is desirable to provide a seat adjustable slide less susceptible to ratcheting than the seat adjuster slides available today.

SUMMARY OF THE INVENTION

To meet the above noted and other desires the present invention is brought forth. The present invention provides a seat adjuster slide wherein in a preferred embodiment the lift bar is sequentially operable at first release position to a second angular positional range. In the second angular positional range, the lift bar contacts the latch and causes the latch tab to disengage from the floor channel notches.

The latch is spring biased and will pivot towards reengagement with one of the notches of the lower channel. If the seat is in the improper position with respect to the vehicle floor when the lift bar is released, the latch will sit on top of the lower channel between the notches. However, the lift bar will fall to the first released angular position. The latch will then be able to pivot horizontally or downward independently of the lift bar. Since the latch can move independent of the lift bar the latch will not have the inertia of the lift bar to retard its angular acceleration upon any future movement of the seat and the latch will virtually always reengage at the next available notch.

The latch tab has a curvilinear surface profile providing a generally constant cam angle of engagement with the notches of the lower channel regardless of the angular position of the latch when the tab is engaged into the notch. The constant cam angle of engagement retards the tendency of the latch tab being "kicked" out of the notch when the tab is presented to the notch at an improper cam angle.

It is an object of the present invention to provide an apparatus and method of utilization thereof of a seat adjuster slide less susceptible to ratcheting. It is also an object of the present invention to provide a master slave horizontally latched seat adjuster.

It is an object of the present invention to provide a manual vehicle seat adjuster slide including a lower channel for connection with the vehicle, the lower channel having a series of longitudinally spaced notches, an upper channel for connection with the seat slidably mounted on the lower channel, a lift bar pivotally connected with the upper channel being sequentially manually operable from a first angular release position to a second angular positional range, and a latch pivotally connected with the upper channel, the latch having a tab for selective engagement into one of the lower channel notches to fix the position of the upper channel with respect to the lower channel, and the latch being spring biased to engage the tab with the upper channel whereby the lift bar in the second angular positional range contacts the latch to disengage the latch from the lower channel notch to allow adjustment of the seat and whereby the lift bar can return to the first release angular position if the latch does not reengage with one of the notches upon manual release of the lift bar.

It is an object of the present invention to provide a vehicle seat adjuster slide including a lower channel for connection with the vehicle, the lower channel having a series of longitudinally spaced notches, an upper channel for connection with the seat slidably mounted on the lower channel, a latch pivotally connected with the upper channel and being angularly biased toward the lower channel having a pivotal axis whereby a line drawn to the pivotal axis of the latch to the top of one of the notches is generally parallel with the lower channel, and a tab connected with the latch for engagement with one of the notches to fix the position of the upper channel with the lower channel having a curvilinear surface of engagement on both sides of the tab with the notch of the lower channel approximating a generally constant cam angle of 6° regardless of the angular position of the latch when the tab is engaged into the notch.

It is an object of the present invention to provide a method of adjusting a vehicle seat utilizing a vehicle seat adjuster slide, the method including connecting with the vehicle a lower channel having a series of longitudinally spaced notches, slidably mounting on the lower channel an upper channel connected with the seat, pivotally connecting with the upper channel a latch angularly biased towards the lower channel, and connecting with the latch a tab for engaging with one of the lower channel notches for fixing the position of the upper channel with the lower channel, the notch having a curvilinear surface engaging with the notch approximating a generally constant cam angle regardless of the angular position of the latch when the tab is engaging into the notch.

Further objects, desires and advantages of the present invention can become more apparent to those skilled in the art as the nature of the invention is better understood from the accompanying drawings and a detailed description.

BRIEF DESCRIPTION OF THE DRAWINGS

FIG. 1 is a side elevational view with portions cut away of a preferred embodiment seat adjuster slide according to the present invention;

FIG. 2 is a top plan view of the seat adjuster slide illustrated in FIG. 1;

FIG. 7 is a top plan view of a seat adjuster of the present invention with a horizontal latch;

FIG. 8 is a view taken along line 8—8 of FIG. 7.

DETAILED DESCRIPTION OF THE DRAWINGS

Figure 3:
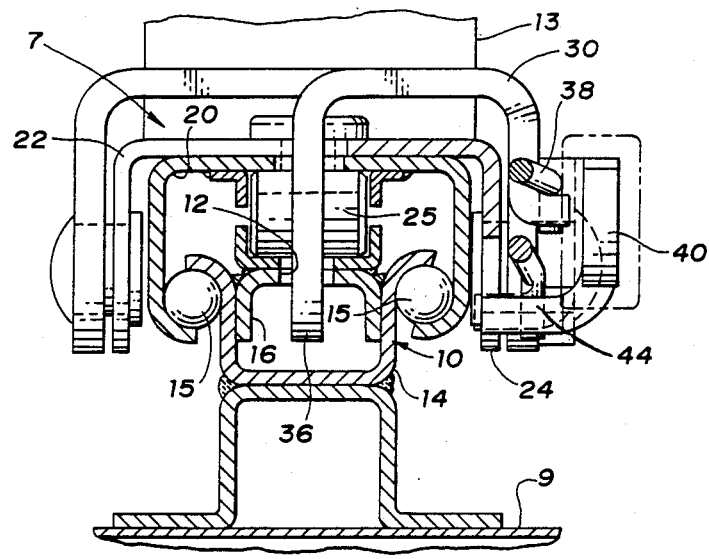
FIG. 3 is a view along line 3—3 of FIG. 1.

Referring to FIGS. 1-4 the manually operable vehicle seat adjuster slide 7 of the present invention has a floor or lower channel 10. The lower channel 10 is typically connected to the vehicle 9 in a fore and aft direction. The floor channel 10 has an outer member 14 and an inner member 16 with a series of longitudinally spaced notches 12.

Slidably mounted on top of the lower channel 10 is the seat or upper channel 20. The upper channel 20 is separated from the lower channel 10 by ball bearings 15 and is spaced from the lower channel by rollers 25, FIG. 3. The upper channel 20 is connected with the vehicle seat 13 (most of the seat 13 has been deleted for clarity of illustration) and is interlocked with the lower channel. Fixably connected by rivets with the upper channel 20 is a saddle 22. The saddle 22 has an extension 24 which is lower than the top surface of the upper channel 20.

Movement of the top channel 20 in relationship to the lower channel 10 provides the fore and aft adjustment of the seat 13. To set the position of the seat 13 there is provided a lock bar commonly referred to as a latch 30. The latch 30 is pivotal in a generally vertical plane and is pivotably attached to the saddle lower extension 24 along a first horizontal axis 34 fixed with respect to the upper channel 120. The latch has a tab 36 which can be selectively engaged with one of the notches 12 of the lower channel 10 to fix the position of the seat 13 within the vehicle 9. A first rod spring 38 is provided to bias the latch 30 to position tab 36 into engagement with the lower channel notches 12.

Having a common pivotal axis with the latch 30 and being pivotally connected also to the saddle lower extension 24 is the lift bar 40. The lift bar has a tab 44 for engagement with the latch 30 as will be later explained. The lift bar 40 has extending therefrom a handle 42 which in a quadmount-type seat adjuster is U-shaped and connects to both lift bars 40 of the parallel mounted adjuster slide 7 of the seat adjuster.

Figure 6:
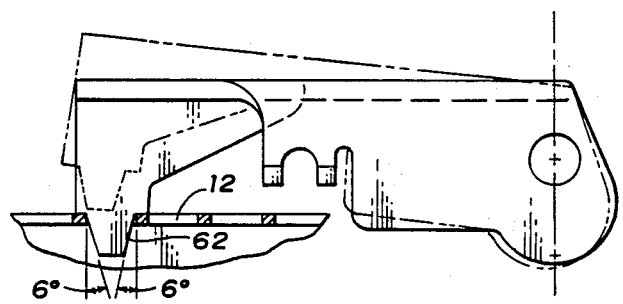
FIG. 6 is a view of a latch on a seat adjuster slide prior to the present invention.

Referring to the above-noted Figures and additionally to FIG. 6 there is a latch 60 provided of an adjuster slide prior to that of the present invention. The tab 61 of the prior latch 60 had a generally straight surface profile(s) 62 providing a cam angle of approximately 6° when fully engaged into a notch 12 of the lower channel (locked position). A cam angle exceeding 8° causes a latch tab to have a tendency to be popped or kicked out from engagement. However, upon initial engagement of tab 61 with the notch of the lower channel, due to the angular position of the latch 60, the tab 61 has a cam angle of approximately 12° to 13° (phantom) thereby facilitating ratcheting of the latch 60.

Figure 4:
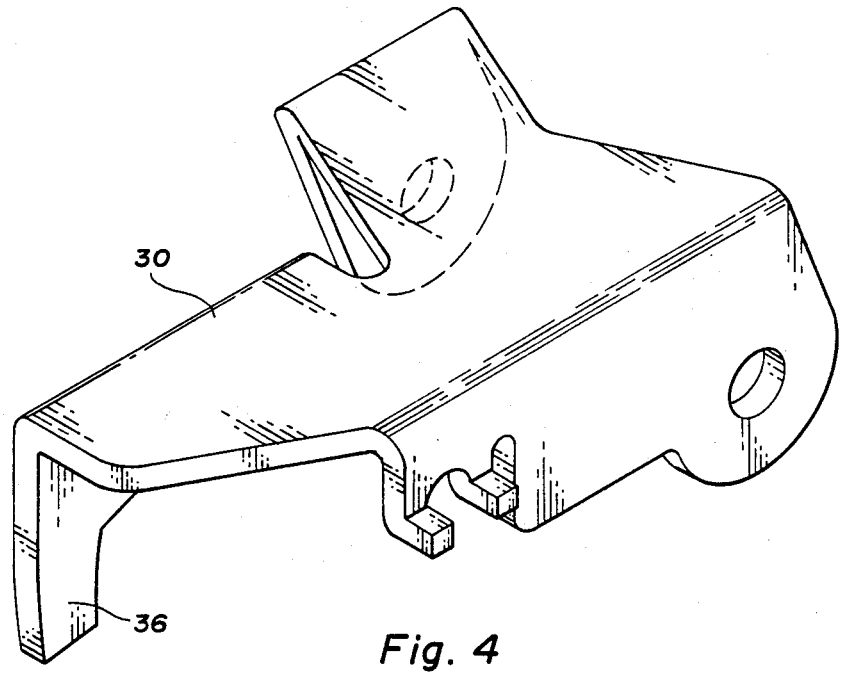
FIG. 4 is a perspective view of the latch of the slide of the present invention.
Figure 5:
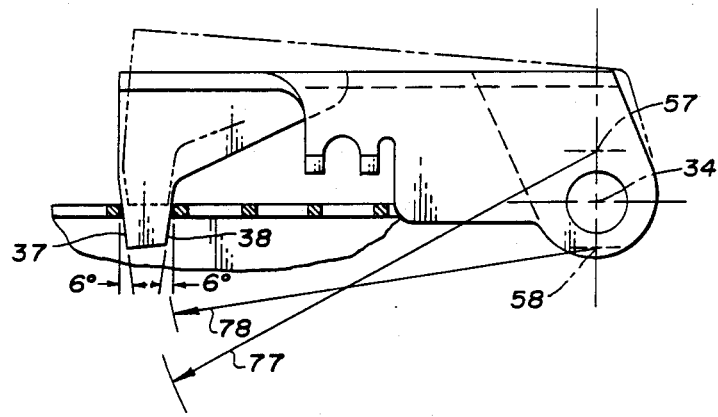
FIG. 5 is an enlarged side elevational view of the latch shown in FIG. 4.

Referring back to the latch 30 of the present inventive adjuster slide 40 in FIGS. 4 and 5, a line drawn between the latch pivotal axis 34 and the point of initial engagement (contact) of the tab 36 with the notch 12 will be generally parallel and colinear with the lower channel 10. Ideally the curvilinear profiles 37,38 of the tab 36 should be that of a spiral ramp conforming to the equation $R = Ce^{\pm ab}$.

R = radius at some point on the spiral
C = constant
a = slope (contact angle) in radians
b = swept angle of spiral segment in radians For simplicity of manufacturing the profiles 37,38 can be provided by the projected radius of two circles having centers 57,58 offset perpendicularly from the pivotal axis 34 of the latch 30. For the most outer profile 37, the center 57 will be offset above the pivotal axis 34 of the latch on a line generally perpendicular with the lower channel 10. The inner profile 38 will have a center 58 offset below the pivotal axis 34 of the latch on a line generally perpendicular with the lower channel 10. It has been found that when complying with the above that a maximum error of about 0.003 millimeters or 0.004 percent occurs. Since the latch pivotal axis 34 is lowered by being pivotally connected with the saddle 22, the cam angle is maintained constantly from initial engagement of tab 36 until full engagement.

In operation, the operator grabs the handle 42 which is connected with the lift bar 40. The lift bar will be in a first angular released position. Upon angularly pivoting the lift bar 40 upward against the biasing force of spring 48, the lift bar will enter into a second angular positional range causing the stub 44 of the lift bar to contact and pivotally move the latch 30 against the action of the spring 38. Continued movement of the lift bar 40 upward will cause the latch 30 to continue to pivot and pull the tab 36 from engagement with the notch 12 allowing the vehicle seat 13 to be adjustably moved to its next desired position.

The seat occupant moves the seat to the next desired position and releases the handle 42. Upon release of the handle 42, lift bar 40 will pivot downward under the influence of gravity assisted by the springs 38, spring 48 will cause the lift bar 40 and the latch 30 to pivot downwardly. The tendency toward ratcheting is reduced since upon initial engagement of tab 36 with notch 12 in a forward or rearward position, the tab 36 will present a profile 37 or 38 with a 6° cam angle. However, on some rare occasions, ratcheting can occur and the tab 36 can be suspended on top of inner member 16 between the notches 12. Upon the lift bar 40 returning to the first angular released position, the latch bar 30 will now be able to pivot independently of the lift bar 40. On any subsequent movement of seat 13, the closure force provided by the spring 38 will only have to overcome the angular moment of inertia of latch 40. In prior situations, the closure force of spring 38 would have to overcome the angular moment of inertia of latch 30 and the handle 42 directly connected to latch 30. Separating the handle 42 from latch 30, the angular acceleration of latch 30 is therefore increased allowing the latch 30 to move faster to reengage the tab 36 with the notches 12. The faster reengagement of tab 36 works against the tendency of any ratcheting beyond a single notch 12 when the tab 36 is "hung up" on the inner member 16 between notches 12.

Another advantage of the present invention is that in situations of the vertically latched quadmounted-type seats, if one adjuster slide latch 40 is not properly engaged, movement of the seat 13 will cause the non-engaged latch to reengage in the next presented notch 12 even if the lift bar 40 has already returned to the first released position.

Referring to FIGS. 7 and 8, a seat adjuster 70 with master 71 slave 72 horizontally latched adjuster slide assemblies. Similar components are referenced with the same reference numerals of FIGS. 1-4. The master slave assembly 71 has a generally horizontal latch 136 with a generally vertical pivotal axis 138 biased to engagement by spring 141. A bracket 80 pivotally mounts lift bar 40 along a generally horizontal pivotal axis 82 perpendicular to pivotal axis 138.

Lift bar 40 has a handle 42 and at an opposite end a flat 44. A collar 83 allows the lift bar 40 to be connected to spring biased slave latch 146 via a flexible connector cable 90. The slave latch 146 has a generally vertical pivotal axis 148.

In operation lift bar 40 is twisted clockwise (as shown in FIG. 8) along pivotal axis 82. By virtue of the twist motion of lift bar 40 space underneath the seat can be conserved since the lift bar does not have to be pulled over like prior lift bars for horizontal latched seat adjusters. Flat 44 adjacent to latch 130 causes latch 130 to pivot counterclockwise (as shown in FIG. 7) to release tab 136 from engagement with notch 12. Contemporaneously the turning of lift bar 40 via collar 83 and cable 90 pulls latch 146 counterclockwise to disengage the slave adjuster assemble. Release of handle 42 allows the weight of handle 42 or springs 141 or 142 will bias lift bar 40 back to the first angular release position illustrated in FIG. 7. Should either latch 130 or 136 fail to properly reengage upon release of lift bar 40, reengagement will occur on the next presented slot upon any movement of the respective upper channel 20. Furthermore, if desired, a torsion spring (not shown) can be added to lift bar 40 to insure the return of lift bar 40 to the release position regardless of the lack of reengagement of the latches 130 or 136.

The present invention provides a method of adjusting a vehicle seat 13 utilizing a manual seat adjuster slide 7 including the following steps:

1. Connecting with the vehicle 9 a lower channel 10 with a series of longitudinally spaced notches 12;
2. Slidably mounting an upper channel 20 connected with the vehicle seat 13 on the lower channel 10;
3. Pivotally connecting to the upper channel 20 a lift bar 40 being sequentially manually operable from a first angular release position to a second angular positional range;
4. Pivotally connecting with the upper channel 20 a latch 30 having a tab 36 for selective engagement into the one of the lower channel notches 12 to fix the position of the upper channel 20 with the lower channel 10; and
5. Spring biasing 38 the latch 30 to an engaged position whereby the lift bar 40 in the second angular positional range contacts the latch 30 to release the latch from engagement with the lower channel notch 12 to allow adjustment of the seat and whereby the lift bar 40 can return to the first angular release position if the latch 30 does not reengage with one of the notches 42 upon manual release of the lift bar 40.

While embodiments of the present invention have been explained, it will be readily apparent to those skilled in the ar of the various modifications which can be made to the present invention without departing from the spirit and scope of this application as it is encompassed by the following claims.

The embodiments of the invention in which an exclusive property or privilege is claimed are defined as follows:

1. A manual vehicle seat adjuster slide, said adjuster slide in combination comprising:
    a lower channel for connection with said vehicle, said lower channel having a series of longitudinally spaced notches;
    an upper channel for connection with said seat slidably mounted on said lower channel;
    a lift bar pivotally connected with said upper channel being sequentially manually operable from a first angular release position to a second angular positional range; and
    a latch pivotally connected with said upper channel along a pivotal axis fixed with respect to said upper channel, said latch having a tab for selective engagement into one of said lower channel notches to fix the position of said upper channel with respect to said lower channel, and said latch being spring biased to engage said tab with said upper channel whereby said lift bar in said second angular positional range, directly contacts said latch to disengage said latch from said lower channel notch to allow adjustment of said seat and whereby said lift bar can return to said first release angular position if said latch does not reengage with one of said notches upon manual release of said lift bar.

2. A seat adjuster slide as described in claim 1 wherein said latch and said lift bar have a common pivotal axis.

3. A seat adjuster slide as described in claim 1 wherein said latch and lift have a horizontal pivotal axis.

4. A manual vehicle adjuster slide, said adjuster slide in combination comprising:
    a lower channel for connection with said vehicle, said lower channel having a series of longitudinally spaced notches;
    an upper channel for connection with said seat slidably mounted on said upper channel;
    a saddle member fixably connected to said upper channel having an extension extending below the top surface of said upper channel;
    a lift bar pivotally connected with said extension of said saddle along a generally horizontal first axis, said lift bar being sequentially manually operable from a first angular release position to a second angular positional range; and a latch pivotally connected with said saddle along said first axis, said latch being pivotal in a generally vertical plane having a tab for selective engagement into one of said lower channel notches to fix the position of said upper channel with respect to said lower channel, said latch being spring biased to an engaged position whereby said lift bar in said second angular positional range contacts said latch to release said latch from engagement with said lower channel notch to allow adjustment of said seat and whereby said lift bar can return to said first angular release position if said latch does not reengage with one of said notches upon manual release of said lift bar.

5. A quadmounted type manual vehicle seat adjuster with master and slave slide assemblies, said adjuster in combination comprising:

generally parallel spaced master and slave lower channels for connection with said vehicle, said lower channels having a series of longitudinally spaced notches;

upper channel for connection with said seat slidably mounted on said master and slave lower channels;

a lift bar pivotally connected with said master upper channel along a generally horizontal pivotal axis being sequentially manually operable from a first angular release position to a second angular positional range;

a slave latch pivotally connected along a generally vertical pivotal axis with said slave upper channel, and said slave latch being connected by a flexible connector with said lift bar said slave latch having a tab for selective engagement into one of said slave lower channel notches to fix the position of said slave upper channel with respect to said slave lower channel, and said slave latch being spring biased to engage said tab with said slave upper channel and said lift bar in said second angular positional range pulls said slave latch to disengage said slave latch from said slave lower channel notch to allow adjustment of said seat; and a master latch pivotally connected along a generally vertical pivotal axis with said master upper channel, said master latch having a tab for selective engagement into one of said master lower channel notches to fix the position of said master upper channel with respect to said master lower channel, and said master latch being spring biased to engage said tab with said master upper channel whereby said lift bar in said second angular positional range contacts said master latch to disengage said master latch from said master lower channel notch to allow adjustment of said seat and whereby said lift bar can return to said first release angular position if said master latch does not reengage with one of said notches upon manual release of said lift bar.

6. A seat adjuster slide as described in claim 5 wherein said lift bar is angularly biased to first angular release position by said master and slave biasing springs.

7. A method of adjusting a vehicle seat utilizing a manual seat adjuster slide, said method in combination comprising:

connecting with said vehicle a lower channel with a series of longitudinally spaced notches;

slidably mounting an upper channel connected with said vehicle seat on said lower channel;

pivotally connecting to said upper channel a lift bar being sequentially manually operable from a first angular release position to a second angular positional range;

pivotally connecting with said upper channel along a fixed pivotal axis with respect to said channel a latch having a tab for selective engagement into said one of said lower channel notches to fix the position of said upper channel with said lower channel; and spring biasing said latch to an engaged position whereby said lift bar in said second angular positional range directly contacts said latch to release said latch engagement from said lower channel notch to allow adjustment of said seat and whereby said lift bar can return to said first angular release position if said latch does not reengage with one of said notches upon manual release of said lift bar.

8. A vehicle seat adjuster slide, said adjuster slide in combination comprising:

a lower channel for connection with said vehicle, said lower channel having a series of longitudinally spaced notches;

an upper channel for connection with said seat slidably mounted on said upper channel;

a latch pivotally connected with said upper channel angularly biased towards said lower channel; and a tab connected with said latch for engagement with one of said lower channel notches to fix the position of said upper channel with said lower channel having a curvilinear surface of engagement with said notch approximating a generally constant cam angle regardless of the angular position of said notch when said tab is engaged into said notch.

9. A vehicle seat adjuster slide as described in claim 9 wherein said cam angle of said tab is between 4° and 8°.

10. A seat adjuster as described in claim 8 for fore and aft movement in said vehicle wherein said cam curvilinear surface is on a fore and aft side of said tab.

11. A vehicle seat adjuster slide as described in claim 8 wherein a line drawn from the pivotal axis of said latch to the point of engagement of said tab with said notch of said lower channel is generally parallel with said lower channel.

12. A seat adjuster slide as described in claim 8 wherein said curvilinear surface of said tab is approximated by a radius of a circle having a axis offset generally perpendicularly from the pivotal axis of said latch.

13. A vehicle seat adjuster slide, said adjuster slide in combination comprising:

a lower channel for connection with said vehicle, said lower channel having a series of longitudinally spaced notches;

an upper channel for connection with said seat slidably mounted on said lower channel;

a latch pivotally connected with said upper channel and being angularly biased toward said lower channel having a pivotal axis whereby a line drawn to the pivotal axis of said latch to the top of one of said notches is generally parallel with said lower channel; and a tab connected with said latch for engagement with one of said notches to fix the position of said upper channel with said lower channel having a curvilinear surface of engagement on both sides of said tab with said notch of said lower channel approximating a generally constant cam angle of 6° regardless of the angular position of said latch when said tab is engaged into said notch.

14. A method of adjusting a vehicle seat utilizing a vehicle seat adjuster slide, said method in combination comprising:
- connecting with said vehicle a lower channel having a series of longitudinally spaced notches;
- slidably mounting on said lower channel an upper channel connected with said seat;
- pivotally connecting with said upper channel a latch angularly biased towards said lower channel; and
- connecting with said latch a tab for engaging with one of said lower channel notches for fixing the position of said upper channel with said lower channel, said notch having a curvilinear surface engaging with said notch approximating a generally constant cam angle regardless of the angular position of said latch when said tab is engaging into said notch.

15. A manual vehicle seat adjuster slide, said adjuster slide in combination comprising:
- a lower channel for connection with said vehicle, said lower channel having a series of longitudinally spaced notches;
- an upper channel for connection with said seat slidably mounted on said upper channel;
- a lift bar pivotally connected with said upper channel being sequentially manually operable from a first angular release position to a second angular range; and
- a latch pivotally connected with said upper channel, said latch having a tab for selective engagement into one of said lower channel notches to fix the position of said upper channel with said lower channel, said latch being spring biased to an engaged position and whereby said lift bar in said second positional range contacts said latch to disengage said tab from said lower channel notch to allow adjustment of said seat and said lift bar can return to said first angular release position if said latch does not reengage with one of said lower channel notches up manual release of said lift bar and whereby said tab of said latch has a curvilinear surface of engagement with said lower channel notch approximating a generally constant cam angle regardless of the angular position of said latch when said tab is engaged into said lower channel notch.

16. A manual vehicle seat adjuster slide, said adjuster slide in combination comprising:
- a lower channel for connection with said vehicle, said lower channel having a series of longitudinally spaced notches;
- an upper channel for connection with said seat slidably mounted on said lower channel;
- a lift bar pivotally connected with said upper channel along a first pivotal axis being sequentially manually operable from a first angular release position to a second angular positional range; and
- a latch pivotally connected with said upper channel along a second pivotal axis perpendicular to said first pivotal axis, said latch having a tab for selective engagement into one of said lower channel notches to fix the position of said upper channel with respect to said lower channel, and said latch being spring biased to engage said tab with said upper channel whereby said lift bar in said second angular positional range contacts said latch to disengage said latch from said lower channel notch to allow adjustment of said seat and whereby said lift bar can return to said first release angular position if said latch does not reengage with one of said notches upon manual release of said lift bar.

17. A manual vehicle seat adjuster slide, said adjuster slide in combination comprising:
- a lower channel for connection with said vehicle, said lower channel having a series of longitudinally spaced notches;
- an upper channel for connection with said seat slidably mounted on said lower channel said upper channel having a top and a fixably connected saddle with a downward extension below said top of said channel;
- a lift bar pivotally connected with said upper channel saddle extension being sequentially manually operable from a first angular release position to a second angular positional range; and
- a latch pivotally connected with said upper channel saddle extension, said latch having a tab for selective engagement into one of said lower channel notches to fix the position of said upper channel with respect to said lower channel, and said latch being spring biased to engage said tab with said upper channel whereby said lift bar in said second angular positional range contacts said latch to disengage said latch from said lower channel notch to allow adjustment of said seat and whereby said lift bar can return to said first release angular position if said latch does not reengage with one of said notches upon manual release of said lift bar.

* * * * *

UNITED STATES PATENT AND TRADEMARK OFFICE
CERTIFICATE OF CORRECTION

PATENT NO. : 4,881,827

DATED : 21 November 1989

INVENTOR(S) : Hans J. Borlinghaus, et al

It is certified that error appears in the above-identified patent and that said Letters Patent is hereby corrected as shown below:

On the title page under Inventors:

After Steven J. Cooper, insert Richard E. Ruis, St. Leonards-On-Sea, England.

Signed and Sealed this

Twentieth Day of October, 1992

Attest:

DOUGLAS B. COMER

Attesting Officer

Acting Commissioner of Patents and Trademarks